United States Patent Office 3,498,943
Patented Mar. 3, 1970

3,498,943
EMULSION POLYMERIZATION OF ETHYLENICALLY UNSATURATED MONOMERS UTILIZING ALKYL SULFIDE TERMINATED OLIGOMERS AS EMULSIFIERS AND RESULTING PRODUCT
Leland E. Dannals, Waterbury, Conn., assignor to Uniroyal, Inc., a corporation of New Jersey
No Drawing. Filed July 1, 1966, Ser. No. 562,097
Int. Cl. C08f 1/13; C08d 1/09
U.S. Cl. 260—29.6    43 Claims

ABSTRACT OF THE DISCLOSURE

This invention relates to emulsion, addition polymerization of rubber and plastic latexes and solid polymers produced therefrom. More spectifically, the instant invention teaches the use of an alkyl sulfide terminated oligomer, having on the oligomeric portion appendant amido and carboxyl groups, as an emulsifier in said emulsion polymerizations.

---

In emulsion polymerization, the emulsifier plays a key role, not only in the polymerization itself, but also in the finishing and properties of the latex. Because of the need to use existing resources as efficiently as possible, the rate of polymerization is a most important factor. It is also essential that the emulsifier form a latex, (1) low in macroscopic discontinuities, such as coagulum, grain, or microfloc which cause manufacturing difficulties and reduce product utility, (2) low in foaming, since this would obviate the need for anti-foaming agents, (3) of small particle size or turbidity of lower value, since this increases productivity and is also beneficial to ultimate use, (4) low in viscosity since this makes for efficient transfer without hold-up losses, (5) of high latex solids concentration, since this increases productivity and decreases transportation costs, and (6) of good mechanical stability, such as giving low values in the S–1 test, since the latex must stand up against deterioration on storage, transport, compounding and use.

In accordance with this invention it has been found that alkyl sulfide terminated oligomers are outstanding emulsifiers for emulsion polymerization. They have the formula:

R—S—$(CH_2—CR^1COOH)_a$—$(CH_2—CR^2CONH_2)_b$—H where R is a straight chain primary (normal), branched chain primary, or secondary alkyl, preferably a normal alkyl group having from 6 to 20 carbon atoms, and preferably from 7 to 12 carbon atoms or mixtures thereof; $R^1$ is either hydrogen, methyl or—$CH_2COOH$; $R^2$ is hydrogen or methyl; $a+b$, the degree of polymerization, is broadly from 6 to 50, preferably from 12 to 30; and $a/(a+b)$ is .075 to 0.4, most preferably 0.075 to 0.30. When a monofunctional acid (i.e., $R^1$ is hydrogen or methyl) is present the upper portion of the ranges are preferred, while for the difunctional acid (i.e., $R^1$ is—$CH_2COOH$) the lower portions are preferred. It should be understood that the monomer units are randomly distributed in the oligomer and that the above structural formula is used for convenience only.

THE EMULSION POLYMERIZATION

The emulsion polymerization of the instant invention may be applied to the preparation of a wide variety of addition polymers. These polymers are formed by the polymerization of vinyl, i.e., copolymerizable monoethylenically unsaturated compounds, and conjugated diolefinic monomers. Among the conjugated diolefin polymers and copolymers are butadiene, butadiene-styrene, butadiene - acrylonitrile, butadiene - vinylidene chloride, and butadiene-methacrylonitrile. The vinyl-type polymers and copolymers are styrene, styrene-acrylonitrile, styrene-methacrylonitrile, ethyl acrylate, ethyl acrylate-vinyl acetate, ethyl acrylate-methyl methacrylate, ethylacrylate-styrene, ethyl acrylate-butyl acrylate and butyl acrylate-acrylonitrile.

The addition polymers produced by the emulsion polymerization of the instant invention may be of the rubber or plastic type, and consequently their emulsions could be termed rubber latex or plastic latex. Rubber may be defined as a material that is capable of recovering from large deformations quickly and forcibly, and can be or already is modified to a state in which it is essentially insoluble (but can swell) in boiling solvent such as benzene, methyl ethyl ketone and ethanol-toluene azeotrope.

Rubber in its modified state, free of diluents, retracts within one minute to less than 1½ times its original length after being stretched at room temperature (20–270 C.) to twice its length and held for one minute before release.

Plastic may be defined as a material that contains as an essential ingredient an organic substance of large large molecular weight, is solid in its finished state, but at some stage in its manufacture or in its processing into finished articles can be shaped by flow.

Particularly preferred polymers of the instant invention are the carboxylated conjugated diolefin type. These include butadiene-styrene or butadiene-acrylonitrile itaconic acid, acrylic acid, methacrylic acid, maleic acid, fumaric acid, cinnamic acid, vinylarylic acid, ethacrylic acid, 2-ethyl-3-propylacrylic acid, beta-acryloxypropionic acid and sorbic acid.

The relative amounts of the aforesaid monomers vary widely and are well known to those skilled in the art. In the case of the carboxylated butadiene-styrene latexes the amount of polymerized butadiene and styrene varies from 40 to 60% by weight based on the total weight of latex and the amount of the carboxyl component generally ranges from 0.5% to 5% of the total polymerized monomers.

The emulsion solution, i.e., the oligomer or salt of the oligomer and water, contains from 10 to 30% solids and has a surprisingly low viscosity, e.g., 1–10 cp., at 10 to 20% solids. Generally, 100 parts by weight of monomer for each 4 or 5 parts of solids in the emulsifier solution are introduced at a temperature of about 50° C. at a pressure of 35–45 p.s.i.g. These conditions are typical and may be varied within wide ranges according to known emulsion polymerization technology.

The range of typical emulsion polymerization recipes and reaction conditions are given in Table 1.

TABLE 1.—RANGE OF TYPICAL EMULSION POLYMERIZATION RECIPES AND REACTION CONDITIONS

| | Broadly | Preferably |
|---|---|---|
| Component, Parts by Weight: | | |
| Monomers | 100 | 100 |
| Water | 70–240 | 90–180 |
| Emulsifier | 2–8 | 3–6 |
| Modifier | 0–1.0 | 0–0.5 |
| Initiator | 0.2–2.0 | 0.3–1.5 |
| Electrolyte | 0–2.0 | 0–0.8 |
| Chelating Agent | 0–0.1 | 0–0.07 |
| Reaction Conditions: | | |
| Temperature, ° C | −25–100 | 30–70 |
| Time, hrs | 10–200 | 15–36 |

The various modifiers, initiators, electrolytes and additives employed are conventional and are known to those skilled in the art. See Whitby, Synthetic Rubber, John Wiley & Sons, Inc., New York, 1954, pp. 224–283. As modifiers, aliphatic mercaptans are most commonly employed; and initators include redox systems, which generate free radicals, with or without complexing agents and, variable valence metal ions. Common initiators are persulfates, peroxides, hydroperoxides, ferricyanide, peroxamines and diazo compounds such as diazo bis(isobutyronitrile).

After about 95 to 100% conversion of monomer to polymer is achieved, the pH of the emulsion is increased to 8.5–9.5 with a base such as ammonium hydroxide. Any unreacted monomer may be driven off by bubbling steam through the solution. This stripping operation is slow and difficult when latexes prepared on convention emulsifiers are involved because of foaming which impedes the distillation of monomers and water and requires foam traps and a distillation pot, only partly full, to avoid loss of latex by foam carry-over. However, latexes prepared with the oligomeric emulsifiers of the instant invention can be stripped rapidly from a nearly full pot, without the use of a foam trap, since they do not foam. This behavior of oligomeric emulsified latexes is unique and useful. While anti-foaming agents can be used with conventional emulsifier latexes, these agents add to cost and may damage polymer properties by appearing in the polymer as a separate phase. Since stripping dilutes the latex, it is finally concentrated to about 50% solids. This operation, too, is greatly facilitated by the absence of foam in oligomeric emulsifier latexes and can be rapidly done by distilling off water from the latex in a distillation pot. Conventional emulsifier latexes can only be concentrated in apparatus which exposes a thin film of the latex, such as a multiple disc concentrator, because of their tendency to foam.

PREPARATION OF THE ALKYL SULFIDE TERMINATED OLIGOMER

These oligomers used in the emulsion polymerization may be readily prepared by reacting an alkyl mercaptan with (1) acrylamide or methacrylamide and (2) itaconic acid, acrylic acid or methacrylic acid in an alcoholic reaction medium in the presence of a free-radical catalyst. The oligomer product is preferably used as a water solution of the free acid or its ammonium, alkali metal salt, e.g., potassium or sodium, alkaline earth metal, group IV heavy metals such as lead and titanium, amine salts, such as the lower alkyl or alkanol substituted ammonium salts, e.g., ethanolamine salt.

The oligomer is formed in an essentially water-free reaction medium, preferably, in a lower alcohol having a boiling point of less than 100° C., e.g., methanol, ethanol and propanol. Other solvents which dissolve the reactants and the catalyst may also be advantageously used.

Generally, the oligomerization temperature is maintained from about 35 to 70° C. Optimum temperature may readily be determined for each oligomerization and depends on reaction rate and relative reactivity of monomers and mercaptans. In order to facilitate the free-radical propagation necessary for an effective catalytic reaction, an oxygen free atmosphere is desirable. This may be obtained by passing an inert gas such as nitrogen through the reaction system.

The catalyst employed may be a free-radical initiator, such as the peroxides and persulfates. As required, activators may be added, e.g., N,N-dimethylaniline.

Particularly outstanding results are obtained with organic hydroperoxides and peroxides, hydrogen peroxide, diazo compounds such as diazo bis(isobutyronitrile) and water soluble persulfates. Specific examples include ammonium persulfate, the alkali metal and alkaline earth metal persulfates and the alkyl peroxides such as lauroyl peroxide, cyclohexyl peroxide and t-butyl peroxide. From 0.1 to 6 grams of the catalyst are employed per total mole of the vinyl monomers (excluding mercaptan) depending on the particular initiator and monomer system. While lesser amounts can be used, it will decrease the conversion. Greater amounts give no significant advantage.

A convenient method for carrying out the reaction is to initially dissolve the alkyl mercaptan and monomers in the alcoholic solvent. The catalyst and activator, if used, may be also charged initially or added during the reaction. As the reaction proceeds the oligomer precipitates. The precipitate is recovered, washed, and dried. A white, free-flowing powder soluble in water is obtained. The powder is dissolved in water and neutralized, if desired, to form a salt as defined above.

Example I shows the preparation of the emulsifier.

EXAMPLE I

Data are presented in Table 3 on the preparation and properties of materials represented by the formula, R—S—[A]$_a$—[acrylamide]$_b$—H, and in Table 4 similar information on R—S—[A]$_a$—[methacrylamide]$_b$—H, with [A] representing in both cases a polymerizable carboxylic acid.

The preparation of n-octyl—S—[itaconic acid]$_2$—[acrylamide]$_{18}$—H is given in detail here, and this general procedure was used for the other syntheses described in Tables 3 and 4.

A wide-mouth gallon jar is charged with 474.4 g. acrylamide, 96.5 g. itaconic acid, 54.2 g. n-octyl mercaptan, 18.6 g. lauroyl peroxide, and 2,339 ml. isopropanol. The lid of the jar is fitted with an agitator, gas inlet and outlet tubes through which nitrogen flows, and a liquid phase thermometer. This ensemble is placed in a 40° C. constant temperature bath. After 45 minutes the reaction mixture is homogeneous and at a temperature of 37.5° C. The subsequent performance is shown in Table 2.

TABLE 2.—OLIGOMERIZATION OBSERVATIONS

| Time Minutes | Temperature, ° C. | N,N-dimethyl aniline added, ml. | Appearnace |
|---|---|---|---|
| 0 | 37.5 | 2.7 | Slight Haze. |
| 25 | 44.0 | 1.7 | White Precipitate. |
| 44 | 50.0 | | |
| 60 | 50.0 | | |
| 75 | 49.0 | 1.5 | |
| 95 | 45.0 | | |
| 135 | 40.0 | | |
| 162 | 39.0 | | |
| 175 | 39.0 | | |

The reaction mixture is vacuum filtered and the retained precipitate is washed with 2500 ml. of isopropanol at room temperature and dried to constant weight by drawing air through it. On drying this material at 105° C. in a vacuum oven, a weight loss of 5.6% occurs. The weight of white free-flowing powder is 580 g. or a 93% yield based on the weight of acrylamide, itaconic acid, and n-octyl mercaptan.

Analysis of this product shows 1.51% sulfur or 6.89% n-octyl mercaptan, 17.16% itaconic acid, and 14.70% nitrogen or 74.55% acrylamide and thus is essentially pure.

To show distribution of molecular size in this product, 54 g. is dissolved in 240 g. water to form a clear solution. Then 300 ml. isopropanol is added slowly with agitation. This forms a cloudy, but apparently homogeneous system, but on standing overnight separates into two clear layers The upper layer is much larger. Separation of these layers and evaporation of solvent gives the following results:

| Material | Weight, g. | Percent Sulfur | Itaconic Acid |
|---|---|---|---|
| Original | 54 | 1.51 | 17.16 |
| Upper Layer | 40 | 1.82 | 16.68 |
| Lower Layer | 13 | 0.63 | 37.02 |

These data show a non-uniform distribution of the sulfur. It is assumed here that the mercaptan determines the molecular size and that there is one sulfur per molecule. A fractionation would separate molecules according to size, so that it is expected that less sulfur would be present in the high molecular weight fraction. Distribution of itaconic acid is uniform, however.

From the charge, the molecular weight of the product is calculated as 1684. Assuming one sulfur per molecule, sulfur analysis shows a molecular weight of 2120, which would be expected since low molecular weight species are probably more soluble in isopropanol, and so do not appear in the product or are removed by washing. The freezing point depression of an aqueous solution of the product (5 g. in 95 g. water) is Δ0.105° C. If the molar freezing point depression of the water for this polyelectrolyte were the same as 0.02 molar oxalic acid (Δ3.40° C.), a molecular weight of 1704 would be indicated.

The product dissolves readily in water to make a 10% solution which has a viscosity of 2.1 cp. at room temperature. The surface tension at various concentrations is given in the following tabulation:

| Concentration, percent | 10 | 1 | 0.1 | 0.01 | 0.001 |
|---|---|---|---|---|---|
| Surface Tension, d./cm | 44 | 40 | 51 | 60 | 99 |

This is typical behavior of a surface active agent.

To show the solubility and surface activity of divalent salts of these oligomers, 1.05 g. Ca(OH)$_2$ is added to a 10% solution of the above product containing 21.4 g. of the oligomer. The amount of calcium hydroxide neutralizes half of the itaconic acid present. The resulting solution is clear, has a 2.3 cp. viscosity and shows a surface tension of 45 d./cm.

Following substantially the same procedure, salts of monovalent cations, viz., sodium, potassium and ammonium, and other divalent cations, viz., calcium, magnesium, zinc and barium, are prepared. All these salts dissolve in water sufficiently to form a 10% solution of low viscosity and surface tension.

Additional runs are summarized in Tables 3 and 4:

TABLE 3.—PART I

Preparation and Properties of R-S[A]$_a$-[acrylamide]$_b$-H Oligomers

| Number | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| Composition: | | | | | | | | | | | | | | | | |
| R | (1) | (1) | (1) | (1) | (1) | (1) | (1) | (1) | (1) | (2) | (2) | (2) | (2) | (2) | (2) | (2) |
| A | (3) | (3) | (3) | (3) | (3) | (3) | (4) | (4) | (4) | (3) | (3) | (3) | (3) | (3) | (3) | (3) |
| a+b | 10 | 20 | 20 | 20 | 20 | 40 | 10 | 20 | 20 | 10 | 15 | 20 | 20 | 40 | 40 | 40 |
| a/(a+b) | 0.075 | 0.05 | 0.10 | 0.15 | 0.20 | 0.10 | 0.15 | 0.1 | 0.2 | 0.075 | 0.10 | 0.05 | 0.10 | 0.05 | 0.1 | 0.25 |
| Reaction: | | | | | | | | | | | | | | | | |
| Initial Initiator [1] | 1.2 | 1.7 | 2.5 | 1.4 | 1.5 | 1.5 | 0.4 | 0.75 | 0.3 | 1.5 | 2.3 | 2.1 | 1.82 | 1.4 | 1.5 | 1.3 |
| Incremental Initiator [1] | 0 | 0 | 0 | 0.7 | 2.2 | 0 | 0.4 | 0 | 0 | 1.5 | 0 | 0 | 0 | 0.9 | 0.72 | 2.6 |
| Initial Activator [2] | 0.37 | 0.51 | 0.35 | 0.4 | 0.5 | 0.24 | 0.13 | 0.23 | 0.09 | 0.45 | 0.68 | 0.62 | 0.55 | 0.40 | 0.50 | 0.38 |
| Incremental Activator [2] | 0 | 0 | 0.41 | 1.2 | 0.75 | 0.24 | 0.13 | 0 | 0.05 | 0.15 | 0.34 | 0 | 0 | 0.46 | 0.24 | 0.95 |
| Isopropanol [3] | 350 | 350 | 350 | 350 | 438 | 350 | 500 | 450 | 400 | 400 | 350 | 350 | 350 | 476 | 350 | 400 |
| Time, Minutes | 150 | 190 | 175 | 170 | 200 | 285 | 160 | 135 | 355 | 165 | 155 | 145 | 175 | 128 | 270 | 150 |
| Yield, percent | 83 | 98 | 88 | 81 | 83 | 97 | 74 | 88 | 81 | 88 | 93 | 97 | 92 | 94 | 97 | 71 |
| Product Analysis, Percent: | | | | | | | | | | | | | | | | |
| R-SH | 13.3 | | 6.9 | 7.4 | | | 13.3 | | 7.6 | 15.8 | | | | | | 1.3 |
| Acrylamide | 75.9 | | 74.5 | 68.9 | | | 75.2 | | 74.0 | 72.2 | | | | | | 55.8 |
| A | 12.2 | | 17.2 | 24.6 | | | 10.5 | | 16.8 | 11.3 | | | | | 15.3 | 41.8 |
| Total | 101.4 | | 98.6 | 100.9 | | | 99.0 | | 98.4 | 99.3 | | | | | | 98.9 |
| 10% Aqueous Solution: | | | | | | | | | | | | | | | | |
| Viscosity, cp | 1.8 | | 2.1 | | | 3.0 | | 2.1 | | | 2.2 | | 3.1 | | | |
| Surface Tension, d./cm | 38 | | 45 | | | 43 | | 39 | | | 44 | | 37 | | | |

[1] Initiator, lauroyl peroxide as g./mole of monomers.
[2] Activator, N,N-dimethyl aniline as g./mole of monomers.
[3] Isopropanol: ml./mole acrylamide.

(1) n-Octyl.
(2) n-Dodecyl.
(3) Itaconic Acid.
(4) Acrylic Acid.

TABLE 3.—PART II

Preparation and Properties of R-S-[A]$_a$-[acrylamide]$_b$-H Oligomers

| Number | 18 | 19 | 20 | 21 | 22 | 23 | 24 |
|---|---|---|---|---|---|---|---|
| Composition: | | | | | | | |
| R | (1) | (1) | (1) | (2) | (2) | (4) | (5) |
| A | (3) | (3) | (3) | (4) | (4) | (3) | (3) |
| a+b | 20 | 40 | 40 | 20 | 20 | 20 | 20 |
| a/(a+b) | 0.20 | 0.05 | 0.15 | 0.10 | 0.20 | 0.20 | 0.25 |
| Reaction: | | | | | | | |
| Initial Initiator [1] | 0.75 | 1.2 | 1.2 | 0.6 | 1.5 | 0.75 | 0.75 |
| Incremental Initiator [1] | 0.55 | 0 | 0 | 1.2 | 1.5 | 0.38 | 0.38 |
| Initial Activator [2] | 0.12 | 0.3 | 0.3 | 0.44 | 0.21 | 0.12 | 0.12 |
| Incremental Activator [2] | 0.28 | 0 | 0 | 0.53 | 0.88 | 0.25 | 0.25 |
| Isopropanol [3] | 450 | 516 | 576 | 450 | 450 | 450 | 450 |
| Time, Minutes | 255 | 119 | 114 | 125 | 180 | 190 | 210 |
| Yield, percent | 84 | 92 | 94 | 87 | 94 | 89 | 89 |
| Product Analysis, percent: | | | | | | | |
| R-SH | | 1.8 | 4.2 | | 6.6 | | |
| Acrylamide | | 84.8 | 77.6 | | 69.8 | | |
| A | | 15.3 | 16.6 | | 20.3 | | |
| Total | | 101.9 | 98.4 | | 96.7 | | |
| 10% Aqueous Solution: | | | | | | | |
| Viscosity, cp | 3.0 | | | | | 2.5 | 2.4 |
| Surface Tension, d./cm | 46 | | | | | 50 | 47 |

[1] Initiator, lauroyl peroxide as g./mole of monomers.
[2] Activator, N,N-dimethyl aniline as g./mole of monomers.
[3] Isopropanol: ml./mole acrylamide.
[4] The R was n-octyl/n-dodecyl in mole ratio of 9/1.
[5] The R was n-octyl/n-dodecyl in mole ratio of 975/25.

(1) n-Dodecyl.
(2) n-Octyl.
(3) Acrylic Acid.
(4) Methacrylic Acid.

TABLE 4

Preparation and Properties of R–S–[A]$_a$–[methacrylamide]$_b$–H Oligomers

| Number | 25 | 26 | 27 |
|---|---|---|---|
| R | n-C$_8$H$_{17}$ | n-C$_8$H$_{17}$ | n-C$_{12}$H$_{25}$ |
| A | Acrylic Acid | Itaconic Acid | Itaconic Acid |
| a+b | 20 | 20 | 20 |
| a/(a+b) | 0.2 | 0.1 | 0.1 |
| Lauroyl Peroxide, g/mole monomers, Initial | 2.5 | ₁ 1.5 | ₁ 1.5 |
| Lauroyl Peroxide, g./mole monomers, Incremental | 2.5 | | |
| N,N-dimethylaniline, g./mole monomers: | | | |
| Initial | 0.75 | | |
| Incremental | 1.87 | | |
| Isopropanol, g./mole methacrylamide | 500 | 274 | 274 |
| Reaction Time, hours | (₂) | 64 | 64 |
| Yield, percent | 83 | 36 | 73 |
| Product Analysis, percent: | | | |
| RSH | 1.6 | | |
| Methacrylamide | 81.7 | | |
| Acid | 13.5 | | |
| Total | 96.8 | | |
| 10% Aqueous Solution Viscosity, cp | 2.8 | | |

₁ These runs are made in bottle reactors at 50° C.
₂ 160 minutes.

The following examples illustrate the emulsion polymerizations and the latexes formed which are within the scope of the instant invention:

EXAMPLE II

Part A

To conduct the emulsion polymerization twenty-four fluid ounce soda bottles containing the polymerization ingredients are fitted with a crown cap having a small hole in the center. The metal cap is fitted with a self-sealing rubber gasket so that upon addition of the materials or removal of samples, by the use of a hypodermic ensemble, the cap will be self-sealing. A plurality of these bottles are rotated, as spokes on a wheel, in a thermostatic bath at 50° C. at eleven revolutions per minute. Prior to capping, the bottles are purged of oxygen by the introduction of a slight excess of butadiene which is allowed to evaporate. The emulsifier used has the formula:

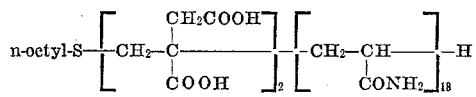

and is a preferred emulsifier. It is dissolved in water and enough calcium hydroxide added to neutralize about half of the acid groups.

The polymerization ingredients, listed in Table 5, are placed in the bottle, in amounts, as grams, equal to twice the indicated figures.

TABLE 5

Emulsion polymerization recipe for a carboxylated butadiene styrene latex

| Component: | Parts by weight |
|---|---|
| Butadiene | 40 |
| Styrene | 59 |
| Itaconic acid | 1 |
| Oligomer | 4 |
| Potassium persulfate | 1.25 |
| Potassium carbonate | 0.4 |
| Tetrasodium ethylene-diamine tetraacetate | 0.07 |
| Tertiary dodecyl mercaptan | 0.1 |
| Water | 90 |

After 40 hours at 50° C. the conversion of monomer to polymer is 99%. The pH of the latex is raised to 9.0 with sodium hydroxide and then placed in a stripper which is heated with agitation, but without vacuum, to 90° C. Stream, at 100° C., is bubbled through the latex and water and residual monomer distilled off until about 100 grams are collected. Steam introduction is then discontinued and a vacuum applied to further concentrate the latex. During these finishing operations no foaming occurs and no coagulum is formed. The latex has the following composition and properties: no grain, microfloc or coagulum; solids 54%; pH 5.0; residual styrene 0.03%; S–1 stability 0.04; surface tension 75 d./cm.; Brookfield viscosity 760 cp.; turbidity 1.15.

The above properties clearly show that a highly desirable latex is formed. Unexpectedly, an outstanding mechanical stability (S–1 test) is obtained at a high surface tension. As mentioned previously, this high surface tension facilitates finishing operations, eliminates the need for anti-foaming agents since the latex does not foam and the outstanding S–1 stability indicates a product that will not readily deteriorate.

The above latex is considerably superior to those obtained using conventional emulsifiers, such as alkyl benzene sulfonates which, at 50% solids, have a surface tension of 40 d./cm. at the same S–1 stability and readily form a foam on agitation which interferes with finishing and use.

Since the above latex has a high surface tension, the oligomeric emulsifier must be virtually absent from the continuous water phase and its air interface. The emulsifier, then, can only be located at the surface of the latex particle since if the oligomers were within the particle, poor mechanical stability of the latex would result. The forces which hold the oligomer at the surface of the latex particle may be physical or chemical, but there is no evidence from changes in oligomeric structure which indicates chemical binding. Thus the potential reactive sites of the oligomer, alpha hydrogen, amide or acid group, can be discounted since oligomers without them give high surface tension latexes. Participation of the sulfide linkage in a chemical reaction during polymerization is best denied by flocculation data on latex of a companion case, where it is shown that the alkyl sulfide oligomer may be separated from the polymer by extra-active processes. It is concluded then, that the oligomer exists unchanged (except, perhaps, for the partial oxidation of the oligomer as heretofore discussed) in the latex at the particle surface only, where it prevents deterioration of the latex.

Part B

The polymer is obtained from the latex by spreading a thin layer of the latex on a glass sheet and allowing the water to evaporate. The polymer film is then dried further in an oven. Stress-strain measurements on this film compared to a similar one prepared from an alkyl-benzene sulfonate-emulsified latex show that for 300% elongation, the former requires 1060 p.s.i., while the latter requires only 420 p.s.i. It is considered that at least a part of this greater strength is due to the affinity of the oligomer for the polymer. Thus, unlike alkyl benzene sulfonate, the oligomer does not form a separate emulsifier phase as the latex dries and so does not exist as strength-reducing discontinuities in the film. The film containing the oligomer is much more nearly colorless than the one containing alkyl benzene sulfonate.

Part C

The polymer in the latex from Part A may also be isolated by flocculation in which enough latex is taken to give 100 g. of solids. To this latex is added 1.5 g. of the antioxidant, [β,β'-bis(2-hydroxy, 3 - nonyl, 5-methyl-benzylthio) diethyl ether] in emulsified form, 700 g. water and with vigorous agitation, 1000 g. of 4% alum (NH$_4$Al(SO$_4$)$_2$·12H$_2$O) solution. The emulsion is destabilized and separates into a clear serum and small pieces of polymer which are removed by filtration and reslurried three times with 1000 g. of water. Titration of the serum shows no oligomer present, and it is, therefore, presumed to be associated with the polymer. The polymer is dried in a 60° C. oven overnight to yield an almost white polymer which has a Mooney viscosity of over 200, and 90% gel in benzene. A latex similar to the above except that it is prepared on alkyl benzene sulfonate yields a slightly yellow polymer which has a Mooney viscosity of over 200 and 87% gel in benzene when it is flocculated in the same way.

EXAMPLE III

Following the procedure and using the polymerization formulation set forth in Example II, Table 6 shows the use of various n-octyl sulfide oligomers as emulsifiers.

Table 6 clearly shows the outstanding properties of the latexes produced in accordance with the instant invention. The outstanding lack of foaming is also observed in these experiments. A good quality product is obtained in Runs 1 through 4 where the degree of polymerization is varied widely, specifically, from 15 to 40. The last three runs, coupled with the previous data, show variations of the mole fraction of the difunctional itaconic acid.

EXAMPLE IV

This example shows wide applicability of the emulsifiers of the instant invention to various polymerization systems. Table 7 illustrates the formation of various homopolymers, copolymers, terpolymers, both carboxylated and non-functional.

TABLE 6
Polymerization of Carboxylated Butadiene-Styrene Latex On Various Oligomers

| Number | 1 | 2 | 3 | 4 | 5 | 6 | 7 |
|---|---|---|---|---|---|---|---|
| Description of R-S-[A]$_a$-[acrylamide]$_b$-H: | | | | | | | |
| R | (1) | (1) | (1) | (1) | (1) | (1) | (1) |
| A | (2) | (2) | (2) | (2) | (2) | (2) | (2) |
| a+b | 15 | 25 | 30 | 40 | 15 | 20 | 20 |
| a/(a+b) | 0.1 | 0.1 | 0.1 | 0.1 | 0.075 | 0.075 | 0.15 |
| Parts Used in Polymerization | 4.0 | 4.0 | 4.0 | 4.0 | 4.0 | 4.0 | 4.0 |
| Fraction Neutralized and Cation | (3) | (4) | (4) | (4) | (5) | (5) | (5) |
| Polymerization Performance: | | | | | | | |
| Percent Conversion | 95 | 98 | 100 | 100 | 98 | 100 | 87 |
| Hours | 23 | 64 | 64 | 64 | 16 | 64 | 24 |
| Coagulum, phm | 0.12 | 0.0 | 0.10 | 0.10 | 0.0 | 0.10 | 0.0 |
| Latex Properties: | | | | | | | |
| Stripped | No | No | No | No | No | No | No |
| Percent solids | 52 | 54 | 55 | 55 | 54 | 55 | 48 |
| pH | 5.1 | 5.5 | 5.1 | 5.1 | 5.0 | 9.0 | |
| Surface Tension, d./cm | 75 | 83 | 71 | 74 | 90 | 69 | 90 |
| Turbidity | 1.14 | 0.84 | 2.13 | 1.91 | 0.37 | | |
| Brookfield viscosity, cp | 370 | 3,375 | 260 | 418 | 9,500 | | |
| S-1 Stability | Nil | 0.27 | 0.21 | 0.02 | 0.38 | | |

(1) n-Octyl.
(2) Itaconic acid.
(3) 1/2 Ca$^{++}$.
(4) 1/2 Ca$^{++}$ plus NaOH to pH 9.
(5) 1/1 Ca$^{++}$.

TABLE 7
Polymerization of Various Monomer Systems on Various Oligomers

| Number | 1 | 2 | 3 | 4 | 5 | 6 |
|---|---|---|---|---|---|---|
| Description of R-S-[A]$_a$-[B]$_b$-H: | | | | | | |
| R | n-Octyl | n-Dodecyl | n-Octyl | n-Octyl | n-Octyl, 975; n-Dodecyl, 25. | n-Octyl, 975; n-Dodecyl, 25. |
| A | Itaconic acid | Itaconic acid | Methacrylic acid | Methacrylic acid | Acrylic acid | Acrylic acid. |
| B | Methacrylamide | Acrylamide | Acrylamide | Acrylamide | Acrylamide | Acrylamide. |
| a+b | 20 | 10 | 20 | 20 | 25 | 25. |
| a/(a+b) | 0.1 | 0.075 | 0.1 | 0.3 | 0.2 | 0.2. |
| Parts Used | 3.5 | 4 | 4 | 4 | 4 | 4. |
| Fraction Neutralized and cation | 1/1 K$^+$ | 1/2 Ca$^{++}$ | 1/1 Ca$^{++}$ | 1/1 Ca$^{++}$ | 1/1 Ca$^{++}$ | 1/2 K$^+$. |
| Other Ingredients in Polymerization Recipe: | | | | | | |
| Monomers/Parts | Butadiene, 40; Styrene, 50; Itaconic acid, 1 | Butadiene, 40; Styrene, 50; Itaconic acid, 1 | Butadiene, 40; Styrene, 59; Itaconic acid, 1 | Butadiene, 40; Styrene, 59; Itaconic acid, 1 | Butadiene, 44; Styrene, 53; Itaconic acid, 3 | Butadiene, 40. Styrene, 59. Itaconic acid 1. |
| K$_2$S$_2$O$_8$ | 1.25 | 1.25 | 1.25 | 1.25 | 1.25 | 1.25. |
| K$_2$CO$_3$ | 0.4 | 0.4 | 0.4 | 0.4 | 0.8 | 0.4. |
| Tetrasodium ethylenediamine tetraacetate | 0.07 | 0.07 | 0.07 | 0.07 | 0.075 | 0.07. |
| Tertiary Dodecyl Mercaptan | 0.01 | 0.01 | 0.01 | 0.01 | None | 0.01. |
| Water | 120 | 105 | 90 | 90 | 120 | 120. |
| Polymerization Performance: | | | | | | |
| Percent conversion | 98 | 98 | 100 | 97 | 100 | 98. |
| Hours | 64 | 18 | 64 | 40 | 64 | 23. |
| Coagulum, phm | 0.55 | 1.70 | 0.0 | 0.0 | 0.9 | 0.0. |
| Latex Properties: | | | | | | |
| Striped | No | Yes | No | No | No | No. |
| Percent Solids | 46 | 50.0 | 55 | 52 | 47 | 46. |
| pH | | | | 4.5 | 4.8 | 4.9. |
| Surface Tension, d./cm | 77 | 80 | 76 | 76 | 66 | 78. |
| Turbidity | | | | | 1.08 | 0.86. |
| Brookfield viscosity, cp | | | 1,660 | | 220 | 210. |
| S-1 Stability | | Nil | | | 0.01 | 0.35. |

TABLE 7—Continued

| Number | 7 | 8 | 9 | 10 | 11 |
|---|---|---|---|---|---|
| Description of R-S[A]$_a$-[B]$_b$-H: | | | | | |
| R | n-Hexyl | n-Octyl | n-Octyl | n-Octyl | n-Dodecyl |
| A | Itaconic acid | Itaconic acid | Itaconic acid | Acrylic acid | Acrylic acid |
| B | Acrylamide | Acrylamide | Acrylamide | Acrylamide | Acrylamide |
| a+b | 15 | 15 | 20 | 20 | 40 |
| a/(a+b) | 0.075 | 0.075 | 0.1 | 0.2 | 0.15 |
| Parts Used | 4 | 4 | 4 | 4 | 4 |
| Fraction Neutralized and Cation | 4/5 Ca$^{++}$ | 1/1 Ca$^{++}$ | 1/2 Ca$^{++}$ | 1/2 Ca$^{++}$ | Free Acid |
| Other Ingredients in Polymerization Recipe: | | | | | |
| Monomers/Parts | Butadiene, 40; Styrene, 59; Itaconic acid, 1 | Butadiene, 80; Itaconic acid | Styrene, 70; Acrylonitrile, 20 | Butadiene, 10; Styrene, 29; Ethyl acrylate, 60; Itaconic acid, 1 | Ethyl acrylate, 97.7; Itaconic acid, 2.3 |
| K$_2$S$_2$O$_8$ | 1.25 | 1.25 | 1.25 | 1.25 | 0.6 |
| K$_2$CO$_3$ | 0.8 | None | None | 0.4 | None |
| Tetrasodium ethylenediamine tetraacetate | 0.07 | 0.07 | 0.07 | 0.07 | None |
| Tertiary Dodecyl Mercaptan | 0.1 | 0.5* | 0.17 | 0.1 | None |
| Water | 90 | 90 | 120 | 90 | 120 |
| Polymerization Performance: | | | | | |
| Percent Conversion | 90 | 90 | 100 | 100 | 100 |
| Hours | 64 | 64 | 64 | 64 | 64 |
| Coagulum, phm | 1.0 | 0.0 | 0.5 | 21.0 | 1.0 |
| Latex Properties: | | | | | |
| Stripped | No | No | No | Yes | No |
| Percent Solids | 48 | 54 | 47 | 55 | 47 |
| pH | | | 4.3 | | |
| Surface Tension, d./cm | 75 | 76 | 73 | 89 | |
| Turbidity | | | 1.10 | 0.87 | |
| Brookfield viscosity, cp | | 285 | 850 | 800 | |
| S-1 Stability | | | 0.09 | | 0.03 |

| Number | 12 | 13 | 14 | 15 | 16 |
|---|---|---|---|---|---|
| Description of R-S[A]$_a$-[B]$_b$-H: | | | | | |
| R | n-Octyl | n-Octyl | n-Dodecyl | n-Dodecyl | n-Octyl |
| A | Itaconic acid | Itaconic acid | Acrylic acid | Acrylic acid | Itaconic acid |
| B | Acrylamide | Acrylamide | Acrylamide | Acrylamide | Acrylamide |
| a+b | 20 | 20 | 40 | 40 | 15 |
| a/(a+b) | 0.1 | 0.1 | 0.15 | 0.05 | 0.075 |
| Parts Used | 4 | 4 | 4 | 4 | 4 |
| Fraction Neutralized and Cation | 1/2 Ca$^{++}$ | 1/2 Ca$^{++}$ | 1/1 Na$^+$ | 1/1 Na$^+$ | 1/1 Ca$^{++}$ |
| Other Ingredients in Polymerization Recipe: | | | | | |
| Monomers/Parts | Butadiene, 49; Styrene, 50; Itaconic acid, 1 | Butadiene, 40; Styrene, 59; Methacrylic acid, 1 | Butadiene, 45; Styrene, 50; Itaconic acid, 5 | Butadiene, 42; Styrene, 55; Methacrylamide, 3 | Butadiene, 70; Acrylonitrile, 30 |
| K$_2$S$_2$O$_8$ | 1.25 | 1.25 | 1.5 | 1.5 | 1.25 |
| K$_2$CO$_3$ | 0.4 | 0.4 | None | None | None |
| Tetrasodium ethylenediamine tetraacetate | 0.07 | 0.07 | None | None | 0.07 |
| Tertiary Dodecyl Mercaptan | 0.5 | 0.1 | 0.5* | 0.5* | 0.5* |
| Water | 120 | 120 | 120 | 120 | 90 |
| Polymerization Performance: | | | | | |
| Percent Conversion | 100 | 99 | 100 | 100 | 99 |
| Hours | 64 | 64 | 64 | 64 | 64 |
| Coagulum, phm | 0.1 | 2.0 | 0 | 0 | 0 |
| Latex Properties: | | | | | |
| Stripped | No | No | No | No | No |
| Percent Solids | 47 | 46 | 47 | 47 | 54 |
| pH | 5.2 | 5.8 | | | |
| Surface Tension, d./cm | 74 | 75 | | | 64 |
| Turbidity | 0.53 | 1.82 | | | |
| Brookfield viscosity, cp | 610 | 280 | | | 120 |
| S-1 Stability | 0.05 | 0.02 | 0.03 | 0.01 | |

*Mixed tertiary mercaptan.

It will be noted in Table 7 that the emulsion polymerization yields a variety of latexes having outstanding properties including the observed absence of foaming in the latex. The particular emulsifier which is most satisfactory for a particular polymerization can be readily determined by those skilled in the art. In some systems the preferred emulsifier will have alkyl groups having a greater number of carbon atoms than in the case of the butadiene-styrene-itaconic acid latex illustrated in the previous examples. Similarly, with many of the systems a higher degree of polymerization of the oligomer or a different mole ratio of the two monomers in the oligomer will be advantageous. Additionally, varying ratios of the monomers to be polymerized in the formation of a latex may have a substantial effect on the properties of the latexes.

EXAMPLE V

This example describes the preparation of a synthetic rubber by emulsion addition polymerization using the oligomer of this invention as the emulsifying agent. The oligomer emulsifier used in this polymerization can be represented by the formula: n-octyl—S—(itaconic acid)$_2$-(acrylamide)$_{18}$—H which was half neutralized with Ca(OH)$_2$. The 50° C. polymerization recipe consists of: butadiene 72, styrene 28, K$_2$S$_2$O$_8$ 1.25, oligomeric emulsifier 4, K$_2$CO$_3$ 0.4, tetrasodium ethylenediamine tetracetate 0.07, tertiary dodecyl mercaptan 0.4, and water 120. After 69 hours at 50° C. a conversion of monomer to polymer of 85% is reached and the polymerization is stopped by injecting 0.2 hydroquinone and removing the bottle from the bath. The resulting latex is stripped of residual monomers with atmospheric steam. Enough of this latex to give 134 g. of solids is mixed with 2.0 g. of antioxidant [tri (mixed mono- and dinonyl phenyl)phosphite] in emulsified form. This mixture is added to a vigorously agitated solution of 268 g. 25% H$_2$SO$_4$ plus 268 g. methanol. This procedure causes the polymer to separate into small pieces and the serum is clear. The polymer is removed, washed with water and dried. The Mooney viscosity of this polymer is 60. A comparable polymer prepared on the sodium salts of mixed fatty acids has a Mooney viscosity of 83.

EXAMPLE VI

This example describes the preparation of a polystyrene plastic by emulsion addition polymerization using the oligomer of this invention as the emulsifying agent. The oligomer and recipe are identical with Example V except that 100 parts styrene replaces the butadiene and styrene and no tertiary dodecyl mercaptan is used. After 16 hours at 50° C., the conversion of monomer to polymer is 100%. Without stripping or addition of antioxidants, enough of this latex to give 10 g. solids is added to 100 g. of a 4% alum solution, which is vigorously agitated. The polystyrene plastic separates into small pieces which are removed from the clear serum, washed and dried. This plastic will not dissolve in toluene, while a similar one prepared on the sodium salt of mixed fatty acids dissolves in toluene and has an intrinsic viscosity of 4.51. About 70% of the polystyrene prepared on the oligomer of this invention dissolves in dimethyl formamide and this solution shows for the polymer an intrinsic viscosity of 0.28. The oligomeric emulsified polystyrene latex is also coagulated by running 22 g. of the latex into a well agitated solution of 21 g. 25% $H_2SO_4$, 21 g. methanol and 57 g. water. This procedure results in a clear serum and pieces of polystyrene which are removed, washed and dried. In this case the plastic dissolves in toluene and has an intrinsic viscosity of 0.38.

EXAMPLE VII

It is the purpose of this example to describe the preparation of an acrylate polymer prepared by emulsion addition polymerization using an oligomer of this invention as the emulsifying agent. The oligomer may be represented by the formula: n-dodecyl—S—(itaconic acid)$_2$-(acrylamide)$_{18}$—H and is fully neutralized with KOH. The 50° C. recipe consists of: butyl acrylate 87, acrylonitrile 13, $K_2S_2O_8$ 0.3, oligomeric emulsifier 5, and water 180. After 64 hours at 50° C. a latex has been formed which has 30.1% solids. The residual monomer is removed from this latex by bubbling atmospheric steam through it. The latex is then added to an equal volume of 1% alum solution which is vigorously agitated. The polymer separates into small pieces which are collected, washed and dried. The Mooney viscosity of this acrylate rubber is 42. A similar acrylate rubber, which is prepared on sodium lauryl sulfate 2.5 and the sodium salt of a condensed naphthalene sulfonate 2.5, in place of the oligomeric emulsifier, has a Mooney viscosity of 41.

EXAMPLE VIII

The preparation and properties of a butadiene-acrylonitrile rubber polymer by means of emulsion polymerization using the oligomer of the instant invention as the emulsifying agent is described. The oligomer, which is brought to pH7 with KOH, may be represented by the formula:

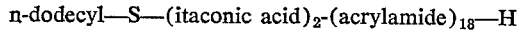

n-dodecyl—S—(itaconic acid)$_2$-(acrylamide)$_{18}$—H

The polymerization recipe consists of: butadiene 60, acrylonitrile 40, $K_2S_2O_8$ 1.25, oligomer 4, t-dodecyl mercaptan 0.4 and water 120. After 15 hours at 50° C., the conversion of monomer to polymer reaches 99%, and the bottle is removed from the bath and shortstopped with 0.2 hydroquinone. Without stripping, enough of the latex to give 100 g. solids is diluted with 200 g. of water, and to this is added, as an emulsion, 1.5 g. antioxidant as described in Example V. This mixture is added to a vigorously agitated solution of 250 g. 25% $H_2SO_4$, 650 g. methanol and 400 g. water. This system separates into a clear serum and small pieces of polymer which are removed, washed and dried. The Mooney viscosity of this butadiene-acrylonitrile rubber addition polymer is 200+. A similar polymer is prepared on the sodium salt of mixed fatty acids and flocced with $H_2SO_4$ and NaCl in the presence of the above antioxidant, shows a Mooney viscosity of 120.

The emulsifiers used in the polymerization of the instant invention have a very narrow molecular weight distribution, e.g., the polydispersity index is always less than 2 and frequently as low as 1.4 to 1.5, as determined by the Gel Permeation Chromatographic technique.

Having thus described my invention, what I claim and desire to protect by Letters Patent is:

1. In the emulsion polymerization of ethylenically unsaturated compounds, the improvement of using as an emulsifier, a compound having the formula:

$RS(CH_2—CR^1COOH)_a—(CH_2—CR^2CONH_2)_b—H$ wherein R is a straight chain primary (normal), branched chain primary or secondary alkyl group having from 6 to 20 carbon atoms, or mixtures thereof, $R^1$ is hydrogen, methyl or —$CH_2COOH$, $R^2$ is hydrogen or methyl, $a+b$ is from 6 to 50; and $a/(a+b)$ is from 0.075 to 0.40, said emulsifier being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

2. The emulsion polymerization process of claim 1 wherein the R is a normal alkyl group having from 7 to 12 carbon atoms, or mixtures thereof, $R^1$ is hydrogen or —$CH_2COOH$; $R^2$ is hydrogen, $a+b$ is from 12 to 30, and $a/(a+b)$ is from 0.075 to 0.3.

3. The emulsion polymerization process of claim 1 wherein R is normal octyl, normal decyl or normal dodecyl, or mixtures thereof, $R^1$ is hydrogen or —$CH_2COOH$, $R^2$ is hydrogen, $a+b$ is about 20 and $a/(a+b)$ is from about 0.1 to 0.2.

4. The emulsion polymerization process of claim 1 wherein said polymerization is the addition polymerization of a vinyl or a conjugated diolefin type monomeric material or mixtures thereof.

5. The emulsion polymerization process of claim 4 wherein said monomeric material is butadiene and styrene.

6. The emulsion polymerization process of claim 5 wherein said monomeric material is polymerized in the presence of a carboxylating agent.

7. The emulsion polymerization process of claim 4 wherein said monomeric material is polymerized in the presence of a carboxylating agent.

8. The emulsion polymerization process of claim 7 wherein said carboxylating agent is itaconic acid, acrylic acid or methacrylic acid.

9. The emulsion polymerization process of claim 4 wherein said monomeric material is butadiene and acrylonitrile.

10. The emulsion polymerization process of claim 9 wherein said monomeric material is polymerized in the presence of a carboxylating agent.

11. A substantially non-foaming latex containing a polymer of ethylenically unsaturated compounds and, as the emulsifier, a compound having the formula:

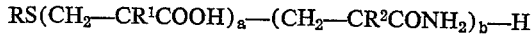

$RS(CH_2—CR^1COOH)_a—(CH_2—CR^2CONH_2)_b—H$ wherein R is a straight chain primary (normal), branched chain primary or secondary alkyl group having from 6 to 20 carbon atoms, or mixtures thereof, $R^1$ is hydrogen, methyl or —$CH_2COOH$, $R^2$ is hydrogen or methyl, $a+b$ is from 6 to 50, and $a/(a+b)$ is from 0.075 to 0.40, said emulsifier being used in the form of (1) the free acid or (2) its partial of complete salt formed by neutralization with ammonium hydroxide, alkali metal hydroxide, alkaline earth metal hydroxide, Group IV heavy metal oxide or hydroxide or lower alkyl or alkanol substituted amines.

12. The latex of claim 11 wherein the R is a normal alkyl group having from 7 to 12 carbon atoms, or mixtures thereof, $R^1$ is hydrogen or —$CH_2COOH$; $R^2$ is hydrogen, $a+b$ is from 12 to 30, and $a/(a+b)$ is from 0.075 to 0.3.

13. The latex of claim 11 wherein R is normal octyl, normal decyl or normal dodecyl, or mixtures thereof, $R^1$ is hydrogen or —$CH_2COOH$, $R^2$ is hydrogen, $a+b$ is about 20 and $a/(a+b)$ is from about 0.1 to 0.2.

14. The latex of claim 11 wherein said latex is an addition polymer of a vinyl or a conjugated diolefin type monomeric material or mixtures thereof.

15. The latex of claim 14 wherein said latex is a carboxylated butadiene-styrene latex.

16. The latex of claim 14 wherein said latex is a butadiene-styrene latex.

17. The latex of claim 14 wherein said latex addition polymer is carboxylated.

18. The latex of claim 17 wherein said latex is carboxylated with itaconic acid, acrylic acid or methacrylic acid.

19. The latex of claim 14 wherein said latex is a butadiene-acrylonitrile latex.

20. The latex of claim 19 wherein said latex is a carboxylated butadiene-acrylonitrile latex.

21. An addition polymer containing an emulsifier and prepared by emulsion polymerization of ethylenically unsaturated compounds using, as the emulsifier, a compound having the formula:

$$RS(CH_2-CR^1COOH)_a-(CH_2-CR^2CONH_2)_b-H$$

wherein R is a straight chain primary (normal), branched chain primary or secondary alkyl group having from 6 to 20 carbon atoms, or mixtures thereof, $R^1$ is hydrogen, methyl or —$CH_2COOH$, $R^2$ is hydrogen or methyl, $a+b$ is from 6 to 50, and $a/(a+b)$ is from 0.075 to 0.4, said emulsifier being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

22. The addition polymer of claim 21 wherein R is a normal alkyl group having from 7 to 12 carbon atoms, or mixtures thereof, $R^1$ is hydrogen or —$CH_2COOH$, $R^2$ is hydrogen, $a+b$ is from 12 to 30, and $a/(a+b)$ is from 0.075 to 0.3.

23. The addition polymer of claim 21 wherein R is normal octyl, normal decyl, or normal dodecyl, or mixtures thereof, $R^1$ is hydrogen or —$CH_2COOH$, $R^2$ is hydrogen, $a+b$ is about 20 and $a/(a+b)$ is from about 0.1 to 0.2.

24. The addition polymer of claim 21 wherein said polymer is formed from a vinyl or a conjugated diolefin type monomeric material or mixtures thereof.

25. The addition polymer of claim 24 wherein said polymer is a butadiene-styrene polymer.

26. The addition polymer of claim 24 wherein said polymer is carboxylated.

27. The addition polymer of claim 26 wherein said polymer is carboxylated with itaconic acid, acrylic acid or methacrylic acid.

28. The addition polymer of claim 24 wherein said polymer is a butadiene-acrylonitrile rubber.

29. The addition polymer of claim 28 wherein said polymer is a carboxylated butadiene-acrylonitrile polymer.

30. A latex formed directly by emulsion polymerization of ethylenically unsaturated compounds using an emulsifier having the formula:

$$RS(CH_2-CR^1COOH)_a-(CH_2-CR^2CONH_2)_b-H$$

wherein R is a straight chain primary (normal), branched chain primary or secondary alkyl group having from 6 to 20 carbon atoms, or mixtures thereof, $R^1$ is hydrogen, methyl or —$CH_2COOH$, $R^2$ is hydrogen or methyl, $a+b$ is from 6 to 50; and $a/(a+b)$ is from 0.075 to 0.4, said emulsifier being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

31. In the emulsion polymerization of ethylenically unsaturated compounds, the improvement of performing said process in the presence of a persulfate and of a compound having the formula:

$$RS(CH_2-CR^1COOH)_a-(CH_2-CR^2CONH_2)_b-H$$

wherein R is a straight chain primary (normal), branched chain primary or secondary alkyl group having from 6 to 20 carbon atoms or a mixture thereof, $R^1$ is hydrogen, methyl or —$CH_2COOH$, $R^2$ is hydrogen or methyl, $a+b$ is from 4 to 50, and $a/(a+b)$ is from 0.075 to 0.40, said compound being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

32. An addition polymer composition containing an emulsifier and prepared by emulsion polymerization of ethylenically unsaturated compounds in the presence of a persulfate and of an emulsifier having the formula:

$$RS(CH_2-CR^1COOH)_a-(CH_2-CR^2CONH_2)_b-H$$

wherein R is a straight chain primary (normal), branched chain primary or secondary alkyl group having from 6 to 20 carbon atoms or mixtures thereof, $R^1$ is hydrogen, methyl or —$CH_2COOH$, $R^2$ is hydrogen or methyl, $a+b$ is from 6 to 50, and $a/(a+b)$ is from 0.075 to 0.40, said compound being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

33. A latex formed directly by the emulsion polymerization of ethylenically unsaturated compounds in the presence of a persulfate and of a compound having the formula:

$$RS(CH_2-CR^1COOH)_a-(CH_2-CR^2CONH_2)_b-H$$

wherein R is a straight chain primary (normal), branched chain primary or secondary alkyl group having from 6 to 20 carbon atoms or mixtures thereof, $R^1$ is hydrogen, methyl or —$CH_2COOH$, $R^2$ is hydrogen or methyl, $a+b$ is from 6 to 50, and $a/(a+b)$ is from 0.075 to 0.40, said compound being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

34. A latex containing a polymer of an ethylenically unsaturated compound and formed directly in the presence of a persulfate and a compound having the formula:

$$RS(CH_2-CR^1COOH)_a-(CH_2-CR^2CONH_2)_b-H$$

wherein R is a straight chain primary (normal), branched chain primary or secondary alkyl group having from 6 to 20 carbon atoms, or mixtures thereof, $R^1$ is hydrogen, methyl or —$CH_2COOH$, $R^2$ is hydrogen or methyl, $a+b$ is from 6 to 50; and $a/(a+b)$ is from 0.075 to 0.40, said emulsifier being used in the form of (1) the free acid or (2) its partial or complete salt formed by neutralization with ammonium hydroxide, alkali metal hydroxide, alkaline earth metal hydroxide, Group IV heavy metal oxide or hydroxide or lower alkyl or alkanol substituted amines.

35. The emulsion polymerization process of claim 31 wherein the R is a normal alkyl group having from 7 to 12 carbon atoms, or mixtures thereof, $R^1$ is hydrogen or —$CH_2COOH$; $R^2$ is hydrogen, $a+b$ is from 12 to 30, and $a/(a+b)$ is from 0.075 to 0.3.

36. The emulsion polymerization process of claim 31 wherein R is normal octyl, normal decyl or normal dodecyl, or mixtures thereof, $R^1$ is hydrogen or —$CH_2COOH$, $R^2$ is hydrogen, $a+b$ is about 20 and $a/(a+b)$ is from about 0.1 to 0.2.

37. The emulsion polymerization process of claim 31 wherein said polymerization is the addition polymerization of a vinyl or a conjugated diolefin type monomeric material or mixtures thereof.

38. The emulsion polymerization process of claim 37 wherein said monomeric material is butadiene and styrene.

39. The emulsion polymerization process of claim 38 wherein said monomeric material is polymerized in the presence of a carboxylating agent.

40. The emulsion polymerization process of claim 37 wherein said monomeric material is polymerized in the presence of a carboxylating agent.

41. The emulsion polymerization process of claim 40 wherein said carboxylating agent is itaconic acid, acrylic acid or methacrylic acid,

42. The emulsion polymerization process of claim 37 wherein said monomeric material is butadiene and acrylonitrile.

43. The emulsion polymerization process of claim 42 wherein said monomeric material is polymerized in the presence of a carboxylating agent.

References Cited

UNITED STATES PATENTS

| 3,131,158 | 4/1964 | Kemp et al. | |
| 2,396,997 | 3/1946 | Fryling | 260—79.5 |
| 2,848,434 | 8/1958 | Hellmann. | |
| 3,028,367 | 4/1962 | O'Brien. | |

SAMUEL H. BLECH, Primary Examiner

W. J. BRIGGS, Sr., Assistant Examiner

U.S. Cl. X.R.

260—29.7, 78.5, 80.7, 80.81, 80.8, 82.1, 82.7, 84.3, 85.5, 85.7, 86.1, 86.7, 88.1, 88.7, 89.5, 93.5, 94.4, 526, 534